Figure 1:
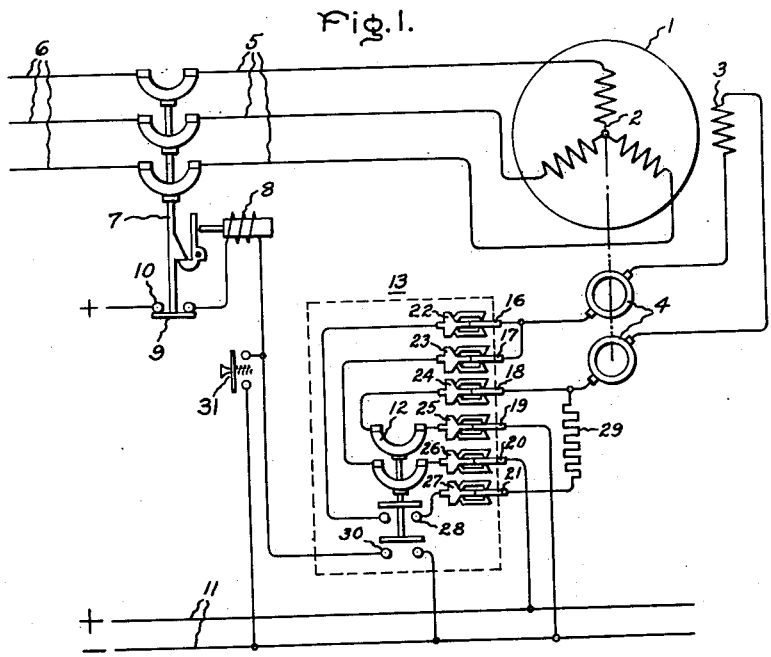

June 7, 1949.

J. W. YETTER ET AL 2,472,642

SWITCHING CONTROL FOR FIELD WINDINGS
OF DYNAMOELECTRIC MACHINERY

Filed June 6, 1945

2 Sheets-Sheet 1

Inventors:
John W. Yetter,
Frederick G. Langer, Jr.,
by Ernest C. Britton
Their Attorney.

June 7, 1949.   J. W. YETTER ET AL   2,472,642
SWITCHING CONTROL FOR FIELD WINDINGS
OF DYNAMOELECTRIC MACHINERY
Filed June 6, 1945   2 Sheets-Sheet 2
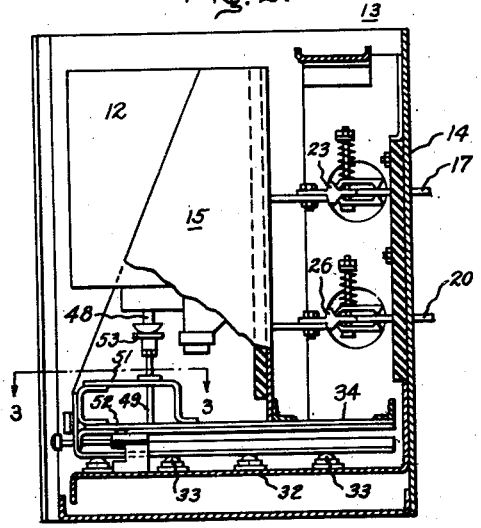
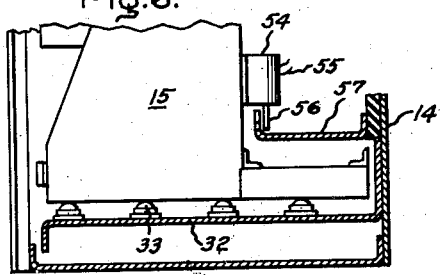
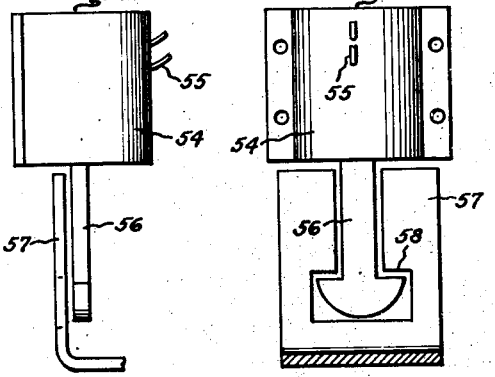
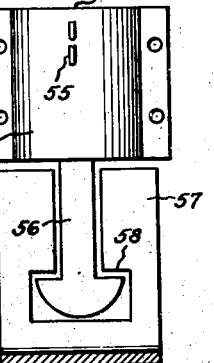
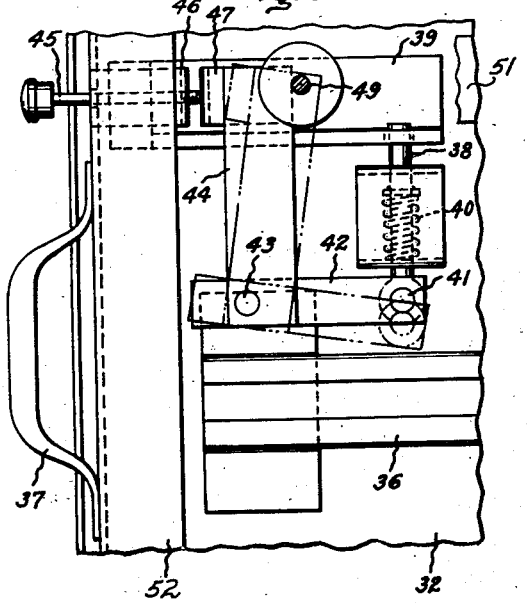
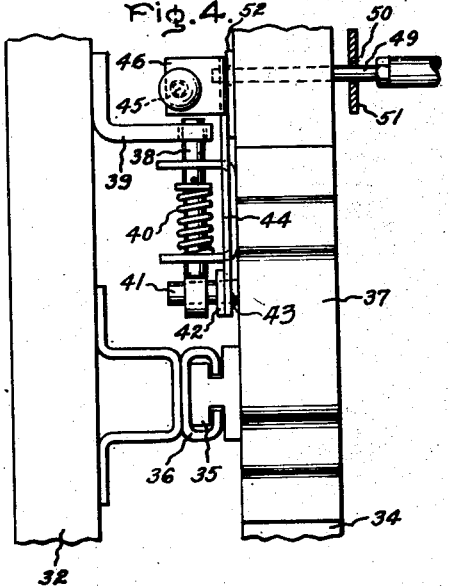
Inventors:
John W. Yetter,
Frederick G. Langer, Jr.,
by Ernest C. Britton
Their Attorney.

Patented June 7, 1949

2,472,642

UNITED STATES PATENT OFFICE 2,472,642

SWITCHING CONTROL FOR FIELD WINDINGS OF DYNAMOELECTRIC MACHINERY

John W. Yetter, Lansdowne, and Frederick G. Langer, Jr., Philadelphia, Pa., assignors to General Electric Company, a corporation of New York Application June 6, 1945, Serial No. 597,822

11 Claims. (Cl. 175—294)

1

Our invention relates to time interval sequential interlocking control arrangements and more particularly to a time interval sequential interlocking control arrangement for drawout type switchgear.

It is common practice when opening the field switches or circuit breakers for controlling the energization of field windings of dynamo-electric machines, such as generators, to complete a discharge circuit for the field winding which may include a resistor thereby limiting the induced voltage and accelerating the decay of current. For normal applications involving commonly used dynamo-electric machines it is estimated that such field current flowing through the discharge circuit would decay to a negligible value within a period of time, probably less than ten seconds, after tripping of the field switch or circuit breaker has occurred. The discharge circuit is usually completed automatically by means of a contact on the field switch or circuit breaker upon opening of the field switch.

In recent years the trend has been toward metal-clad switchgear and accordingly it is desirable for the field switch of the dynamo-electric machine to be a metal-clad unit and consequently of the drawout type. It would be desirable to employ as a field switch for a dynamo-electric machine electric switchgear of the type disclosed and claimed in Mahoney Patent 2,298,828, granted October 13, 1942, and assigned to the same assignee as the present application. With drawout type switchgear, such as is disclosed in the above mentioned Mahoney patent, the discharge circuit for the field of the dynamo-electric machine would be opened if the field switch were withdrawn from its metal-clad unit immediately after it had been tripped. If the field switch were withdrawn before the current in the discharge circuit had decayed to a sufficiently low value, damage to apparatus and danger to operating personnel might occur.

It is an object of our invention to provide a drawout type switch for controlling the field winding of a dynamo-electric machine in the manner described above with sequential time delay interlocking means that will make it impossible to withdraw the switch after opening the field circuit for a substantial time interval sufficient to permit the current in the discharge circuit to decay to a negligible value.

It is another object of our invention to provide a new and improved sequential time delay interlocking control arrangement for switches con-

2 trolling the field winding of dynamo-electric machines.

Further objects and advantages of our invention will become apparent as the following description proceeds and the features of novelty which characterize our invention will be pointed out with particularity in the claims annexed to and forming a part of this specification.

Figure 5:
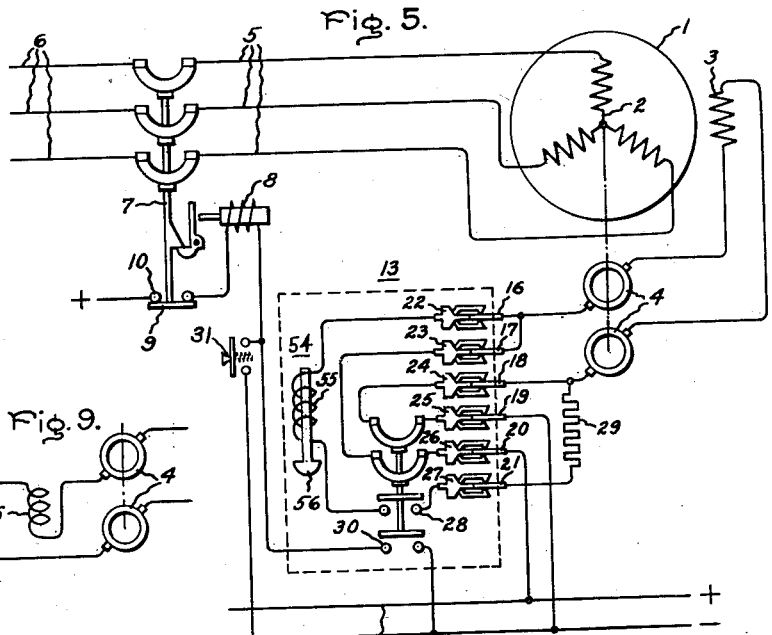
Figure 9:
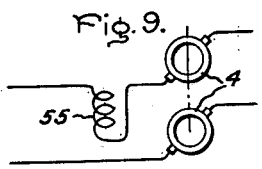
Figure 10:
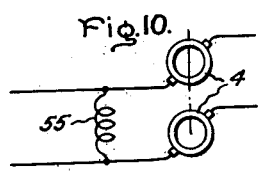

For a better understanding of our invention, reference may be had to the accompanying drawings in which Fig. 1 is a schematic diagram illustrating an application of our invention with the field switch schematically shown; Fig. 2 is an elevation view, partly in section, of the field switch shown schematically in Fig. 1; Fig. 3 is a view taken on line 3—3 of Fig. 2; Fig. 4 is an enlarged side view of a portion of Fig. 2; Fig. 5 is a view similar to Fig. 1 illustrating another modification of our invention; Fig. 6 is a partial elevational view similar to Fig. 2 illustrating the field switch employed in Fig. 5; Fig. 7 is an enlarged view of a portion of Fig. 6; Fig. 8 is a side view of Fig. 7, and Figs. 9 and 10 are schematic diagrams of portions of the arrangement shown in Fig. 5 to illustrate still other modifications of our invention.

Although our invention may have many applications, we have chosen to illustrate it in connection with an arrangement for controlling the field winding of a dynamo-electric machine. Referring now to Fig. 1, we have illustrated a dynamo-electric machine, such as a generator 1, having a main polyphase winding 2, and a field winding 3 connected to suitable slip-rings 4. The polyphase main winding 2 is connected to a polyphase circuit 5 which in turn is connected to a suitable load circuit 6 through a polyphase circuit breaker 7, which is illustrated as of the latch closed type having a trip coil 8 and an "a" auxiliary switch 9 which bridges contacts 10 when the circuit breaker 7 is closed and opens contacts 10 when the circuit breaker 7 is open.

Field winding 3 is preferably energized from a suitable source of direct current energy 11 through a field switch 12 schematically illustrated in Fig. 1, which forms a part of a metal-enclosed unit generally designated by the numeral 13. The metal-enclosed or metal-clad unit 13 is of the drawout type and preferably substantially like that disclosed in the above mentioned Mahoney patent. In Figs. 2, 3 and 4 the drawout type switchgear schematically shown in Fig. 1 is shown in detail with the corresponding parts designated by the same reference numerals as in Fig. 1. This metal-clad switchgear comprises a stationary metal housing 14 and a removable unit 15 which includes the field switch or circuit breaker 12. Stationary housing 14 is arranged in the form of a cubicle having sheet metal walls supported by a frame of angle members. For the purpose of clearness and simplicity in the drawings the bus bars, cable leads, circuits and accessory apparatus are omitted from stationary housing 14. The only electrical portions of the apparatus associated with stationary housing 14 are the stationary portions 16, 17, 18, 19, 20 and 21 of the primary disconnecting contacts only two of which, namely, 17 and 20, are shown in Fig. 2. As is clearly shown in Fig. 1, the stationary portions 16 to 21, inclusive, of the primary disconnecting contacts are adapted electrically to engage the movable portions 22, 23, 24, 25, 26 and 27 of the primary disconnecting contacts which are associated with the removable unit 15. With this arrangement, when the removable unit 15, including the circuit breaker 12, is withdrawn from the metal housing 14, all of the circuits are broken at the primary disconnecting contacts.

The stationary portions 17 and 18 of the primary disconnecting contacts are connected to the slip-rings 4, while the associated movable portions 23 and 24 are connected to one side of double-pole field switch 12. The terminals on the other side of double-pole field switch or circuit breaker 12 are connected to the movable portions 25 and 26 of the primary disconnecting contacts while the associated stationary portions 19 and 20 are connected to source 11. It will be obvious that when field switch or circuit breaker 12 is closed, as is shown in Fig. 1, direct current power will be supplied to field winding 3 through field switch or circuit breaker 12 and slip-rings 4. The additional primary disconnecting contacts 16, 22, 21 and 27 are provided for the discharge circuit for field winding 3 and might comprise secondary disconnecting contacts. However, in order to simplify the drawing, these disconnecting contacts have been shown substantially like the primary disconnecting contacts described above. Field switch or circuit breaker 12 is provided with contacts 28 which are open when the field switch or circuit breaker is closed, as is indicated in Fig. 1, but which close when the switch or circuit breaker 12 is open. These contacts 28 control the discharge circuit for field winding 3 and preferably are arranged to complete the discharge circuit early during the opening operation of field switch 12. The discharge circuit for field winding 3, controlled by contacts 28, preferably includes a resistor 29 and the disconnecting contacts 16, 22, 21 and 27.

A second set of interlocking contacts 30 which are closed when the field switch or circuit breaker 12 is open are connected in the circuit with the trip coil 8 so that the main circuit breaker 7 will be tripped when contacts 30 close. A suitable manual trip switch 31 has been indicated for controlling the energization of trip coil 8 associated with main circuit breaker 7.

Referring now to Figs. 2, 3 and 4, opening of the disconnecting contacts 16 to 27, inclusive, occurs when removable unit 15 is withdrawn from housing 14. Housing 14 includes a horizontal platform 32 on either side of which are provided a row of anti-friction devices, such as ball bearings 33. The removable unit 15 also includes a platform 34 which is arranged to slide on anti-friction devices 33. In order to guide the movement of platform 34 cooperating members 35 and 36 are provided on platforms 34 and 32, respectively. The platform 34 of removable unit 15 is provided with a suitable handle 37 which is fastened to the front edge thereof so that it may be grasped by an operator to withdraw the removable unit 15 in drawer fashion.

As is disclosed in the above mentioned Mahoney patent, the removable unit 15 is provided with a locking device to hold the unit in a plurality of positions. This locking device comprises a pin 38 supported from platform 34 which is adapted to engage with one or more suitable openings in an angle member 39 fastened to platform 32 of stationary housing 14. A suitable spring 40 biases pin 38 into engagement with the openings in angle member 39. Pin 38 is connected, as is indicated at 41, with a lever 42 pivotally mounted at 43 to platform 34. In accordance with our invention lever 42 is provided with an integral arm 44 so that lever 42 and arm 44 form sort of a bell crank. In order to actuate the bell crank 42—44 to cause withdrawal of pin 38 from the openings in angle iron 39, we provide a pin 45 threadedly mounted in a suitable member 46 fastened to platform 34. If pin 45 is rotated so as to move toward lever 44 it engages a suitable bumper 47 associated with lever 44 and continued rotation thereof in the same direction causes 38 to be withdrawn from angle member 39, after which movement of the movable unit 15 relative to stationary housing 14 may occur.

As will be understood by those skilled in the art, it is necessary to provide metal-enclosed switch units of the drawout type with suitable interlocking means so that it is impossible to insert or withdraw the removable unit or break connection at the primary disconnecting contacts without first tripping the switch or circuit breaker and furthermore insuring that the circuit breaker is open both when the unit is moved out of and into operative position. We have illustrated a circuit breaker of the same type disclosed in the above mentioned Mahoney patent having a manually operable trip-knob or handle 48, upward movement of which causes tripping of circuit breaker 12. As is clearly disclosed in the above mentioned Mahoney patent, we have provided an interlocking means comprising a vertical pin 49 mounted directly below trip-knob 48 and guided by suitable openings 50 provided in bracket members 51 and 52 supported on movable unit 15. The upper part of pin 49 adjacent knob 48 is provided with an enlargement 53 to facilitate manual movement thereof. The lower end of pin 49, as is clearly shown in Fig. 3, extends closely adjacent lever 44 when pin 38 is inserted in one of the openings in angle member 39. Pin 49 prevents movement of levers 42 and 44 and consequently movement of pin 38. As a result, removable unit 15 cannot be withdrawn from housing 14 so as to cause disengagement of the primary disconnecting contacts unless pin 49 is first moved upwardly to free lever 44. The upward movement of pin 49 will cause upward movement of knob 48 and consequent tripping of the circuit breaker 12.

Our invention is particularly concerned with the provision of the threaded operating means 45 which requires a substantial time to operate whereby it is impossible to withdraw the removable unit 15 after the circuit breaker or field switch 12 has been opened and the discharge circuit for field winding 3 completed until the current in the discharge circuit has decayed to a negligible value. With the arrangement disclosed in the Mahoney patent, it is possible to open the primary disconnecting contacts immediately following tripping of the circuit breaker 12 before the current flowing in the field discharge circuit has decayed to a safe value. A substantial time delay is provided between the time when pin 49 is raised to trip the circuit breaker and button 45 is rotated a sufficient number of turns to remove locking pin 38 from the openings in angle iron 39. Thus after the first interlocking pin 49 is released upon opening the breaker, many successive turns of the threaded operating button 45 will be required to operate the lever 44 from the full-line position in which it is shown in Fig. 3 to the position indicated by the dash-dot lines wherein the second interlocking pin 38 in the series is withdrawn from the opening in the angle iron 39 against the bias of spring 40 so as to free the breaker for manual withdrawal a substantial time interval after the opening thereof. It will also be obvious that removable unit 15 cannot be replaced in housing 14 and the field switch or circuit breaker 12 closed without setting up the interlock for the next withdrawal.

Although in Figs. 1 to 4 we have disclosed a mechanical interlocking scheme for preventing withdrawal of the removable unit of the switchgear controlling the energization of field 3 until the current in the field discharge circuit has decayed to a negligible value, electrical interlocking schemes might be employed. In Figs. 5, 6, 7 and 8 we have disclosed such an electrical interlocking scheme which is a modification of the arrangement described above. The corresponding parts of Figs. 5 to 8 are designated by the same reference numerals as in Figs. 1 to 4. In accordance with the invention disclosed in Figs. 5 to 8 we provide an electromagnetic device 54 comprising a winding 55 and an armature 56 which may be fastened either to stationary housing 14 or removable unit 15. As illustrated in Fig. 5 electromagnetic device 54 is fastened to removable unit 15. A cooperating interlocking member 57 is then fastened to the other one of the units, namely the stationary housing 14. As is clearly shown in Fig. 5, the winding 55 is connected in series with the field discharge circuit including resistor 29 and disconnecting contacts 16, 22, 21 and 27, as well as the back contacts 28 on field switch 12. When little or no current is flowing through winding 55, armature 56 is in the position indicated in Figs. 7 and 8 so as to be capable of freely moving through T-shaped slot 58 in interlocking member 57 and removable unit 15 can be moved out of stationary housing 14. If a current flows in the field discharge circuit, armature 56 is pulled upwardly so that if removable unit 15 were pulled out of position, armature 56 would interfere with interlock member 57 and withdrawal of removable unit 15 would be precluded. With this arrangement it is obvious that withdrawal of removable unit 15 to interrupt the field discharge circuit until the current flowing in the field discharge circuit has decayed to a negligible value cannot be accomplished.

Although we have disclosed the winding 55 in Fig. 5 as connected in the field discharge circuit between primary disconnecting contacts 22 and 27, it will be understood that it could be connected in series with field winding 3, as is clearly shown in Fig. 9, or in parallel with field winding 3 so as to be responsive to the potential across the field winding as is shown in Fig. 10. In either case withdrawal of the removable unit to interrupt the field discharge circuit is prevented until the current flowing in this circuit has decayed to a negligible value.

While we have shown and described particular embodiments of our invention, we do not desire our invention to be limited to the constructions shown and described for it will of course be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. In a metal-enclosed switchgear for controlling the field winding of a dynamo-electric machine provided with a field discharge circuit and means for completing said discharge circuit in response to the opening of the circuit of said field winding; a drawout type switch for closing and opening the circuit of said field winding and having manually operable means for effecting withdrawal of said switch, means for opening said discharge circuit upon withdrawal of said switch, and sequential interlocking means including a first movable interlocking element having one position for tripping the switch and means for biasing said element to an alternative position for preventing operation of said withdrawal means until said element is moved to said one position, and a second interlocking element movable with a time delay to a releasing position and interlocked with said first movable interlocking element for preventing the operation of said withdrawal means for a substantial time interval after the operation of said first movable interlocking element to said one position.

2. In a metal-enclosed switchgear arrangement for controlling the field winding of a dynamo-electric machine provided with a field discharge circuit and means for completing said discharge circuit in response to the opening of the circuit of said field winding; a drawout type switch for controlling the energization of said field winding having manual means for effecting withdrawal of said drawout type switch, means including a series of movable interlocking elements for preventing said withdrawal unless said switch is in the open position, means for opening said discharge circuit upon withdrawal of said drawout type switch, and means including a manually operable interlocking threaded member effective after the opening of said switch for moving one of said elements to a non-interlocking position with a time delay for delaying the withdrawal of said drawout type switch to open said discharge circuit for a substantial time interval thereafter.

3. In a metal-enclosed switchgear arrangement for controlling the field winding of a dynamo-electric machine provided with a field discharge circuit and means for completing said discharge circuit in response to the opening of the circuit of said field winding; a drawout type switch for controlling the energization of said field having manual means for effecting withdrawal of said drawout type switch, interlocking means for preventing said withdrawal unless said switch is in the open position, means for opening said discharge circuit upon withdrawal of said drawout type switch, and electro-magnetic means connected in said discharge circuit and having an interlocking element for delaying the withdrawal of said drawout type switch to open said discharge circuit until the current in said discharge circuit is reduced to a negligible value.

4. In a metal-enclosed switchgear for controlling the field winding of a dynamo-electric machine provided with a field discharge circuit and means for completing said discharge circuit in response to the opening of the circuit of said field winding; a drawout type switch for controlling the energization of said field winding comprising means for preventing withdrawal of said drawout type switch unless said switch is in the open position, means for opening said discharge circuit upon withdrawal of said drawout type switch, and means responsive to the current flowing in said discharge circuit for delaying the withdrawal of said drawout type switch to open said discharge circuit until the current in said discharge circuit is reduced to a negligible value.

5. In a metal-enclosed switchgear arrangement for controlling the field winding of a dynamo-electric machine provided with a field discharge circuit and means for completing said discharge circuit in response to the opening of the circuit of said field winding; a drawout type switch for controlling the energization of said field winding comprising means for preventing withdrawal of said drawout type switch unless said switch is in the open position, means for opening said discharge circuit upon withdrawal of said drawout type switch, and means including an electromagnetic device responsive to the current flowing in said field winding for delaying the withdrawal of said drawout type switch to open said discharge circuit until the current in said discharge circuit has reduced to a negligible value.

6. A metal-enclosed drawout type switch for controlling the energization of the field winding of a dynamo-electric machine having means for completing a discharge circuit for said field winding in response to the opening of said switch, means for opening said discharge circuit upon withdrawal of said drawout type switch, and means including a series of interlocking elements for preventing the withdrawal of said drawout switch, one of said elements having connections for operation thereof to the releasing position upon the opening of said switch and another of said elements having time-delay means under control of said one element to delay the withdrawal of said switch to open said discharge circuit for a substantial time interval after the opening of said switch.

7. For use in metal-enclosed switchgear, a drawout type switch for controlling the energization of the field winding of a dynamo-electric machine, comprising means for completing a discharge circuit for said field winding upon the opening of said field switch, means for opening said discharge circuit upon withdrawal of said drawout type switch, and means responsive to the current flowing in said discharge circuit for preventing withdrawal of said drawout type switch to open said discharge circuit following opening of said field switch until the current in said discharge circuit has reduced to a predetermined safe value.

8. In a metal-enclosed switchgear arrangement for controlling the field winding of a dynamo-electric machine provided with a field discharge circuit and means for completing said discharge circuit in response to the opening of the circuit of said field winding; a drawout type switch for controlling the energization of said field winding comprising means for preventing withdrawal of said drawout type switch unless said switch is in the open position, means for opening said discharge circuit upon withdrawal of said drawout type switch, and means responsive to the potential across said field winding for delaying the withdrawal of said drawout type switch to open said discharge circuit until the current in said discharge circuit is reduced to a negligible value.

9. In a metal-enclosed switchgear arrangement for controlling the field winding of a dynamo-electric machine provided with a field discharge circuit and means for completing said discharge circuit in response to the opening of the circuit of said field winding; a drawout type switch for controlling the energization of said field winding comprising means for preventing withdrawal of said drawout type switch unless said switch is in the open position, means for opening said discharge circuit upon withdrawal of said drawout type switch, and means including an electromagnetic device responsive to the potential across said field winding for delaying the withdrawal of said drawout type switch to open said discharge circuit until the current in said discharge circuit has reduced to a negligible value.

10. For use in metal-enclosed switchgear, a drawout type switch for controlling the energization of the field winding of a dynamo-electric machine, comprising means for completing a discharge circuit for said field winding upon the opening of said field switch, means for opening said discharge circuit upon withdrawal of said drawout type switch, and means responsive to the potential across said field winding for preventing withdrawal of said drawout type switch to open said discharge circuit following opening of said field switch until the current in said discharge circuit has reduced to a predetermined safe value.

11. In a metal-enclosed switchgear for closing an inductive circuit and for completing a discharge circuit upon opening said inductive circuit; a drawout type switch for closing and opening said inductive circuit and having manually operable means for effecting withdrawal of said drawout type switch, means for opening said discharge circuit upon withdrawal of said switch, and sequential interlocking means including a first movable interlocking element having one position for tripping said switch and an alternative position for preventing operation of said withdrawal means, and a second interlocking element movable with a time delay to a releasing position and interlocked with said first movable interlocking element for preventing the operation of said withdrawal means for a substantial time interval after the operation of said first movable interlocking element to said one position.

JOHN W. YETTER.
FREDERICK G. LANGER, Jr.

REFERENCES CITED

The following references are of record in the file of this patent:

UNITED STATES PATENTS

| Number | Name | Date |
| --- | --- | --- |
| 790,983 | Rucker | May 30, 1905 |
| 1,717,823 | Whiting | June 18, 1929 |
| 1,869,856 | Macneil | Aug. 2, 1932 |
| 1,940,930 | Wyman | Dec. 26, 1933 |
| 2,271,972 | Engel | Feb. 3, 1942 |
| 2,298,828 | Mahoney | Oct. 13, 1942 |
| 2,358,198 | Wyman | Sept. 12, 1944 |